United States Patent
Kim et al.

(10) Patent No.: US 10,855,511 B2
(45) Date of Patent: Dec. 1, 2020

(54) CAR AUDIO OUTPUT CONTROL DEVICE AND METHOD THEREFOR

(71) Applicant: GM GLOBAL TECHNOLOGY OPERATIONS LLC, Detroit, MI (US)

(72) Inventors: Sungkyu Kim, Dongducheon-si (KR); Suhwan Yu, Seoul (KR)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 16/093,328

(22) PCT Filed: Apr. 10, 2017

(86) PCT No.: PCT/KR2017/003874
§ 371 (c)(1),
(2) Date: Oct. 12, 2018

(87) PCT Pub. No.: WO2017/179870
PCT Pub. Date: Oct. 19, 2017

(65) Prior Publication Data
US 2019/0199574 A1 Jun. 27, 2019

(30) Foreign Application Priority Data
Apr. 15, 2016 (KR) .................. 10-2016-0046068

(51) Int. Cl.
*H04M 1/60* (2006.01)
*H04L 29/06* (2006.01)
(Continued)

(52) U.S. Cl.
CPC .............. *H04L 29/06* (2013.01); *B60R 11/02* (2013.01); *G01C 21/3629* (2013.01);
(Continued)

(58) Field of Classification Search
CPC ...... H04R 2420/01; H03G 3/20; H03G 3/301; H04M 1/6083
See application file for complete search history.

(56) References Cited

U.S. PATENT DOCUMENTS

| 8,295,888 B2 | 10/2012 | Mizuta | |
|---|---|---|---|
| 2007/0140187 A1* | 6/2007 | Rokusek | H04L 67/16 370/338 |
| 2012/0259440 A1* | 10/2012 | Zhang | G06F 9/4881 700/94 |

FOREIGN PATENT DOCUMENTS

| CN | 102117221 A | 7/2011 |
|---|---|---|
| JP | 11041691 | 2/1999 |

(Continued)

OTHER PUBLICATIONS

Extended European Search Report for European Patent Application No. 17782625.2 dated Oct. 14, 2019 (7 pages).

(Continued)

*Primary Examiner* — Thomas H Maung
(74) *Attorney, Agent, or Firm* — Reising Ethington, P.C.

(57) ABSTRACT

A car audio output control device and a method therefor are disclosed. When an acoustic source is generated by the peripheral device, the control device controls a car audio output such that when a device acoustic source and an identification code are received while a source acoustic source self-generated by a car audio is outputted, the control device selects one output mode matched with the received identification code from among the plurality of output modes and controls the source acoustic source and the device acoustic source according to the selected output mode so as to change the car audio output.

5 Claims, 2 Drawing Sheets

(51) Int. Cl.
  *B60R 11/02* (2006.01)
  *G11B 5/02* (2006.01)
  *H03G 3/20* (2006.01)
  *G11B 20/10* (2006.01)
  *G01C 21/36* (2006.01)
  *G08C 17/02* (2006.01)
(52) U.S. Cl.
  CPC ............... *G08C 17/02* (2013.01); *G11B 5/02* (2013.01); *G11B 20/10* (2013.01); *H03G 3/20* (2013.01)

(56) References Cited

FOREIGN PATENT DOCUMENTS

| | | | |
|---|---|---|---|
| JP | 2013223031 A | 10/2013 | |
| KR | 1020080072046 A | 8/2008 | |
| KR | 1020090007889 U | 8/2009 | |
| KR | 1020100068756 A | 6/2010 | |
| KR | 1020100080102 A | 7/2010 | |
| KR | 101082936 B1 | 12/2010 | |

OTHER PUBLICATIONS

First Chinese Office Action for Chinese Patent Application No. 201780022258.3 dated Oct. 29, 2019 (7 pages).
English machine translation of First Chinese Office Action for Chinese Patent Application No. 201780022258.3 dated Oct. 29, 2019 (9 pages).
Chinese Office Action for Chinese Application No. 201780022258.3 dated Jun. 30, 2020 (17 pages).

\* cited by examiner

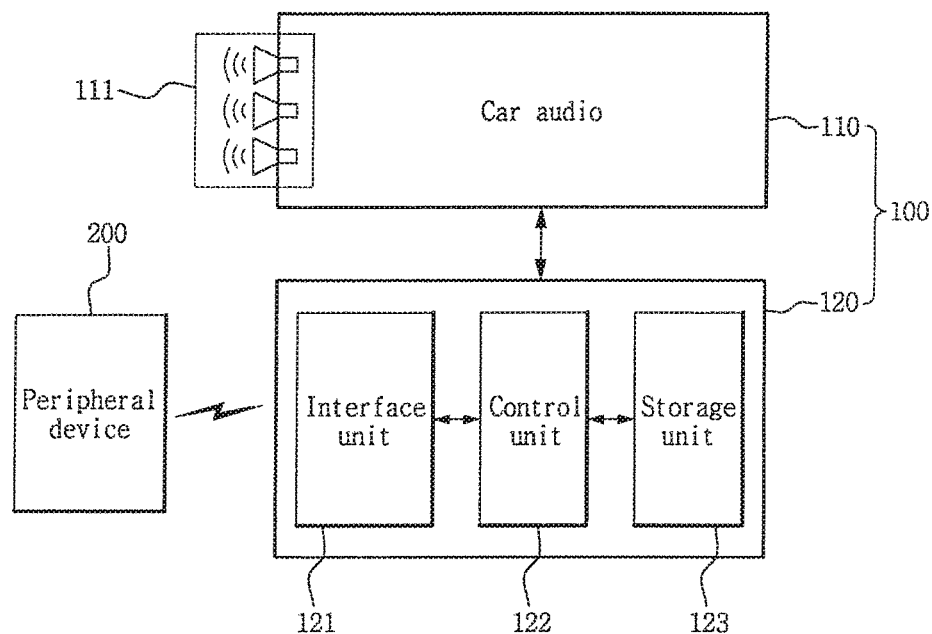

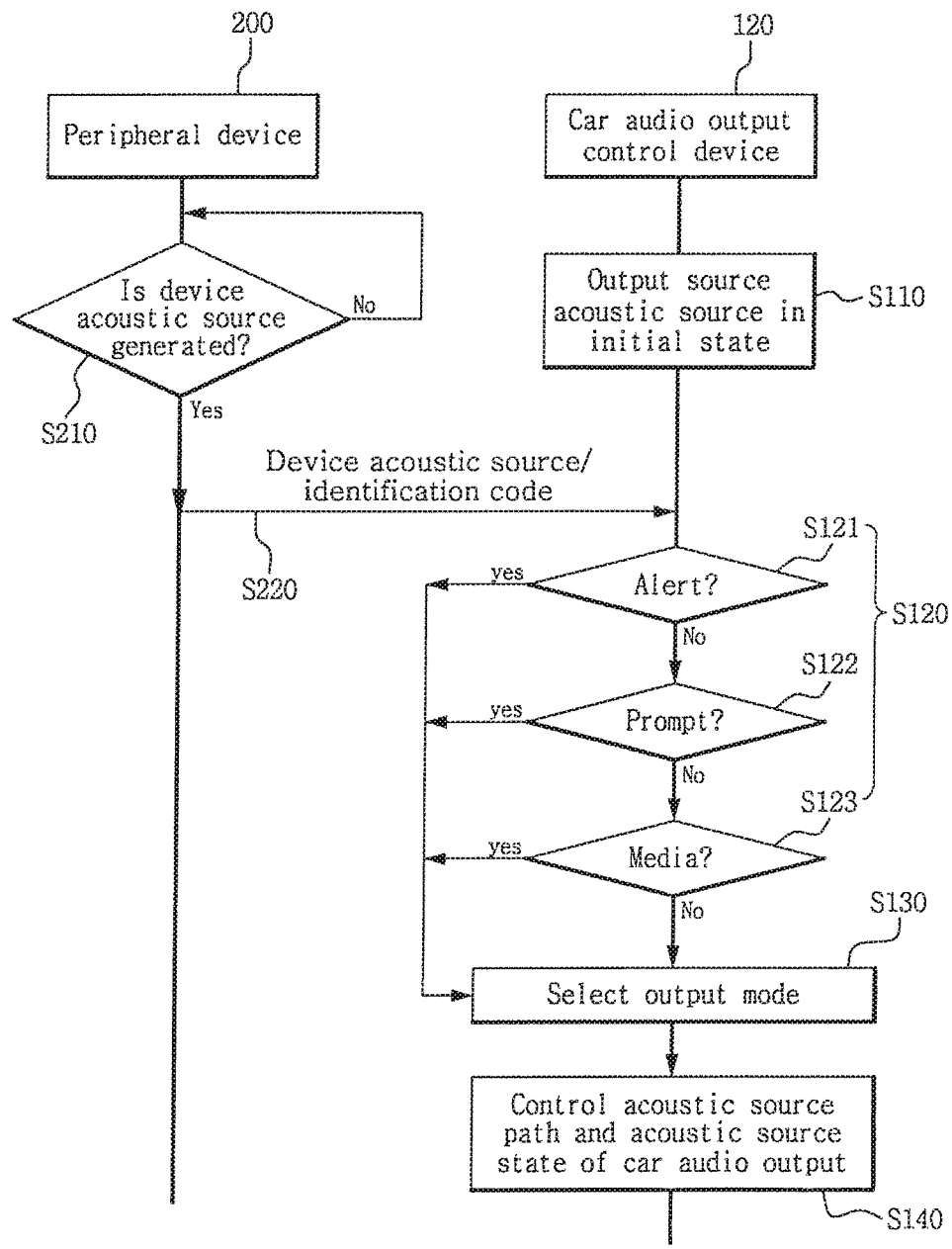

CAR AUDIO OUTPUT CONTROL DEVICE AND METHOD THEREFOR

INTRODUCTION

The present disclosure relates to a car audio output control device and a method therefor, and more particularly, to a control device for optimally controlling the car audio output change according to the acoustic source attribute, and allowing a user to clearly recognize important information (notification, emergency/disaster information) provided as an acoustic source and a method therefor.

Conventionally, while a driver is listening to a car audio device, an acoustic source, for example, voice announcement, generated from a navigation device is automatically outputted through the car audio device.

According to an example, it checks if there is a profile containing the setting for how to output a car audio acoustic source when an acoustic source is generated from a navigation device. When such a profile does not exist, the car audio acoustic source is muted and only the navigation acoustic source is outputted, and when such a profile exists, the car audio acoustic source and the navigation acoustic source are mixed and outputted according to the corresponding profile (e.g., volume).

Additionally, recently technology is in widespread use that makes use of an automatic car audio output function via wired/wireless connection of the car audio to not only a navigation device but also a smart device (typically, a smartphone).

However, when controlling the car audio output, the automatic car audio output is uniformly executed without considering the device type or the attribute of an acoustic source generated from the corresponding device, failing to achieve flexible and efficient control suitable for the attribute of the acoustic source.

For example, while the car audio is in use, when important information (notification, emergency/disaster information) is generated from the wiredly/wirelessly connected navigation device or smart device, the user may not listen to the important information outputted at the beginning. Or, due to the continuous mixing output, undistinguishable mixing of two acoustic sources may hinder the user from clearly recognizing the important information.

On the other hand, when the car audio output mode is set to output the navigation/smart device with priority, there may be a problem with clearly recognizing important information from the car audio.

That is, despite that attributes of acoustic sources (e.g., the type or importance of acoustic sources) generated according to circumstances when connecting the car audio to the peripheral device are different from one another, all acoustic sources are uniformly processed by a preset method irrespective of their attributes, and there is a limitation of failing to properly control the car audio output.

SUMMARY

In an embodiment, the present disclosure is designed to solve the problem such as those described above, and in an embodiment an object of the present disclosure is to provide a car audio output control device for readily recognizing an acoustic source attribute and optimally controlling the car audio output change according to the recognized acoustic source attribute and a method therefor.

Another object of the present disclosure, in an embodiment, is to provide a car audio output control device for allowing a user to clearly recognize important information (notification, emergency/disaster information) provided as an acoustic source in any situation inside the vehicle and a method therefor.

The technical object to be achieved by the present disclosure is not limited to the above-mentioned technical objects, and these and other technical objects will be clearly understood by those having ordinary skill in the technical field pertaining to the present disclosure from the following description.

To achieve the above-described object, in an embodiment, a car audio output control device according to the present disclosure includes a storage unit that stores an identification code for each output mode with respect to a plurality of output modes, an interface unit that receives a device acoustic source and an identification code defining an attribute of the device acoustic source from a peripheral device, and a control unit that controls an output of a car audio such that when a device acoustic source and an identification code are received through the interface unit while a source acoustic source self-generated from a car audio is outputted, the control unit selects one output mode matched with the received identification code from among the plurality of output modes, and controls the source acoustic source and the device acoustic source according to the selected output mode so as to change the output of the car audio, wherein an acoustic source path and acoustic source state of the output of the car audio are controlled so as to be different with respect to each of the plurality of output modes.

In the car audio output control device according to the present disclosure, an identification code may be a value of setting the importance of a device acoustic source, the plurality of output modes may be a value of adjusting the level of focus on listening to a device acoustic source, and the control unit may select an output mode according to a value of an identification code received together with a device acoustic source, and control the output of the car audio based on the selected output mode so that the level of focus on listening is adjusted to suit the importance of a device acoustic source.

The car audio output control device according to the present disclosure may define the plurality of output modes such that the level of focus on listening to a device acoustic source increases with the increasing importance of the device acoustic source according to an identification code.

The car audio output control device according to the present disclosure may control at least one function of whether to change an acoustic source path of the output of the car audio, whether to stop a source acoustic source, whether to mute a source acoustic source, whether to mix a device acoustic source with a source acoustic source, and a mixing profile so as to be different for each of the plurality of output modes.

In the car audio output control device according to the present disclosure, when the received identification code is a first identification code, the control unit may mute a source acoustic source being reproduced and output a device acoustic source as the output of the car audio, when the received identification code is a second identification code, the control unit may reduce the volume of a source acoustic source being reproduced, mix the source acoustic source with a device acoustic source, and output a mixed acoustic source as the output of the car audio, and when the received identification code is a third identification code, the control unit may stop reproducing a source acoustic source, and change an acoustic source path of the output of the car audio to the peripheral device to output a device acoustic source as the car audio output.

Meanwhile, a car audio output control method according to the present disclosure includes outputting a source acoustic source self-generated by a car audio, receiving a device acoustic source and an identification code defining an attribute of the device acoustic source from a peripheral device, and selecting one output mode matched with the received identification code from among a plurality of preset output modes and controlling the source acoustic source and the device acoustic source according to the selected output mode so as to change the output of the car audio, wherein an acoustic source path and acoustic source state of the output of the car audio are controlled so as to be different with respect to each of the plurality of output mode.

According to the car audio output control device and the method therefor according to the present disclosure, it is possible to readily recognize an acoustic source attribute and optimally control the car audio output change according to the recognized acoustic source attribute.

Additionally, according to the car audio output control device and the method therefor according to the present disclosure, it is possible to allow a user to clearly recognize important information (notification, emergency/disaster information) provided as an acoustic source in any situation inside the vehicle.

BRIEF DESCRIPTION OF THE DRAWINGS

FIG. 1 is a schematic diagram of a car audio system including a car audio output control device according to an embodiment of the present disclosure.

FIG. 2 is a table showing a plurality of identification codes and output modes that can be used in a car audio output control device according to an embodiment of the present disclosure.

FIG. 3 is a flowchart illustrating a car audio output control method according to an embodiment of the present disclosure.

DETAILED DESCRIPTION

Hereinafter, a car audio output control device and a method therefor according to an embodiment of the present disclosure will be described in detail with reference to the accompanying drawings.

FIG. 1 is a schematic diagram of a car audio system including a car audio output control device according to an embodiment of the present disclosure.

Referring to FIG. 1, the car audio system 100 according to an embodiment of the present disclosure includes a car audio 110 and a car audio output control device 120, and is connected to a peripheral device 200 wiredly/wirelessly to transmit and receive various types of signals and acoustic sources.

In FIG. 1, the car audio 110 processes source acoustic sources self-generated via many acoustic source paths (e.g., FM/AM radio, storage media including CD/Memory Disk, etc.), or device acoustic sources from the wiredly/wirelessly connected peripheral device 200 and outputs them through an output unit 111 to allow a user to hear.

The car audio output unit 111 is configured to output an acoustic source, and may be implemented as a speaker or an output port.

The peripheral device 200 (e.g., a smartphone, a tablet PC, a navigation device, etc.) is connected to the car audio system 100 via near-field communication to transmit and receive various types of signals, and provides and outputs a device acoustic source generated (reproduced) from the peripheral device 200 to the car audio 110 as per request from the car audio output control device 120.

For example, the peripheral device 200 and the car audio system 100 may be connected to each other via wired communication such as Universal Serial Bus (USB) or near-field wireless communication such as Bluetooth, Near Field Communication (NFC), Zigbee and Wi-Fi to transmit and receive various types of signals and acoustic sources through the interface unit 121.

In particular, for the car audio output control device 120 to readily recognize the attribute of a device acoustic source, a device acoustic source from the peripheral device 120 is transmitted to the car audio output control device 120 together with an identification code defining the attribute of the corresponding device acoustic source.

The car audio output control device 120 may include an interface unit 121, a control unit 122 and a storage unit 123 as shown.

The interface unit 121 is configured to transmit and receive signals and acoustic sources with the peripheral device 200 and the car audio output unit 111, and when an acoustic source generated (reproduced) from the wiredly/wirelessly connected peripheral device 200 is detected, the interface unit 121 receives a device acoustic source and an identification code defining the attribute of the device acoustic source from the peripheral device 200 and transmits them to the control unit 122.

Additionally, the interface unit 121 provides the device acoustic source to the car audio 110 under the control of the control unit 122 so that the corresponding device acoustic source is outputted through the car audio output unit 111.

The storage unit 123 stores identification codes that are preset for each output mode with respect to a plurality of output modes.

The control unit 122 controls the output of the car audio 110 such that when the device acoustic source and the identification code are received through the interface unit 121 while the source acoustic source self-generated from the car audio 110 is outputted, the control unit 122 identifies the identification codes for each output mode stored in the storage unit 123, selects one output mode matched with the received identification code from among the plurality of output modes, and controls the source acoustic source and the device acoustic source according to the selected output mode so as to change the car audio output.

In this instance, an acoustic source path and an acoustic source state of the car audio output are controlled so as to be different for each of the plurality of output modes.

For example, to control an acoustic source path and an acoustic source state of the car audio output so as to be different for each output mode, the control device 120 may differently set, in each output mode, at least one function of whether to change an acoustic source path of the car audio output, whether to stop a source acoustic source, whether to mute a source acoustic source, whether to mix a device acoustic source with a source acoustic source, and a mixing profile.

In an embodiment, the identification code is a value of setting the importance of a device acoustic source, and the plurality of output modes is a value of adjusting the level of focus on listening to a device acoustic source.

In this case, the control unit 122 selects one output mode matched with the identification code received from the peripheral device 200 together with the device acoustic source from among many output modes according to the value of the identification code, and controls the car audio output based on the selected output mode so that the level of focus on listening is adjusted to suit the importance of the device acoustic source.

Further, the plurality of output modes may be defined such that the level of focus on listening to the device acoustic source increases with the increasing importance of the device acoustic source according to the identification code.

FIG. 2 is a table showing the plurality of identification codes and output modes that can be used in the car audio output control device according to an embodiment of the present disclosure.

When transmitting an acoustic source to the car audio system 100, the peripheral device 200 transmits an identification code that can be recognized by the car audio system 100. The car audio output control device 120 recognizes the identification code and performs different output control operations according to the identification code.

Each identification code may be defined according to the attribute of an acoustic source (e.g., the importance of an acoustic source or the type of an acoustic source).

In the example of FIG. 2, an identification code is a value that defines the type of an acoustic source among the attribute of the acoustic source, and is classified into three, first to third identification codes (#01, #02, #03), and first to third output modes (Mode A, Mode B, Mode C) matched to the three identification codes (#01, #02, #03) respectively are defined.

For example, when an acoustic source is audio stream (media), the first identification code (#01) may be attached, when an acoustic source is prompt, the second identification code (#02) may be attached, and when an acoustic source is alert, the third identification code (#03) may be attached.

When the identification code received from the peripheral device 200 is the first identification code (#01) (e.g., the device acoustic source is alert), the control unit 122 may change from the initial state to the first output mode (Mode A), and mute the source acoustic source that the car audio 110 is currently outputting (reproducing) and output the device acoustic source as car audio output.

When the received identification code is the second identification code (#02) (e.g., the device acoustic source is prompt), the control unit 122 may change to the second output mode (Mode B), reduce the volume of the source acoustic source that the car audio 110 is reproducing, mix the corresponding source acoustic source with the device acoustic source provided from the peripheral device 200 and output the mixed acoustic source as car audio output.

The mixing profile for the second output mode (Mode B) may be preset, and the mixing profile may include the volume of each of a source acoustic source and a device acoustic source to mix, a frequency band to change and its gain, and information associated with sound effect to add.

When the reproduction of the device acoustic source provided from the peripheral device 200 is completed in the first output mode (Mode A) and the second output mode (Mode B), it may go back to the initial state to output the source acoustic source being reproduced by the car audio 110.

When the received identification code is the third identification code (#03) (e.g., the device acoustic source is audio stream), the control unit 122 may change to the third output mode (Mode C), stop reproducing the source acoustic source, and change the acoustic source path of the car audio output itself to the peripheral device 200 to output the device acoustic source as car audio output.

FIG. 3 is a flowchart illustrating a car audio output control method according to an embodiment of the present disclosure.

In the initial state, the car audio output control device 120 processes source acoustic sources self-generated (reproduced) via many acoustic source paths (e.g., FM/AM radio, storage media including CD/Memory Disk, etc.) of the car audio 110 and outputs them through the output unit 111 (S110).

Additionally, the car audio output control device 120 detects if a device acoustic source is generated from the peripheral device 200 (e.g., a smartphone, a tablet PC, a navigation device, etc.) wiredly/wirelessly connected with the car audio system 100.

When a device acoustic source is generated (reproduced) from the peripheral device 200 (S210), the car audio output control device 120 detects it through the interface unit 121, and receives the device acoustic source and an identification code defining an attribute of the device acoustic source from the peripheral device 200 (S220).

Subsequently, the car audio output control device 120 selects one output mode matched with the identification code received through S220 from among a plurality of preset output modes, and controls the source acoustic source and the device acoustic source according to the selected output mode so as to change the car audio output (S120 to S140).

To this end, the plurality of output modes is predefined such that an acoustic source path and an acoustic source state of the car audio output are controlled so as to be different, and identification codes matched with each output mode are preset and stored.

When transmitting the device acoustic source to the car audio system 100, the peripheral device 200 transmits the identification code that can be recognized by the car audio system 100, and the car audio output control device 120 recognizes it and performs different output control operations according to the identification code.

As described above, each identification code may be defined according to the attribute of an acoustic source (e.g., the importance of an acoustic source or the type of an acoustic source).

In an embodiment, the car audio output control device 120 recognizes the type of the device acoustic source as one of alert, prompt and audio stream (media) based on the identification code received in S220 (S120), and selects the output mode as one of the first to third output modes according to the recognized type of the device acoustic source (S130).

When the identification code received in S220 together with the device acoustic source is a first identification code, the car audio output control device 120 recognizes the device acoustic source as alert (e.g., emergency/disaster information) (S121), and changes from the initial state to the first output mode (S130).

In the first output mode, the control device 120 mutes the source acoustic source that the car audio 110 is currently reproducing/outputting, and outputs the device acoustic source generated from the peripheral device 200 through the car audio output unit 111 (S140).

When the received identification code is a second identification code, the car audio output control device 120 recognizes the device acoustic source as prompt (e.g., notification) (S122), and changes from the initial state to the second output mode (S130).

In the second output mode, the control device 120 reduces the volume of the source acoustic source that the car audio 110 is currently reproducing, mixes the source acoustic source with the device acoustic source, and outputs the mixed acoustic source through the car audio output unit 111 (S140).

When the reproduction of the device acoustic source provided from the peripheral device 200 is completed in the first output mode and the second output mode, it may go back to the initial state to output the source acoustic source being reproduced by the car audio 110.

When the received identification code is a third identification code, the car audio output control device 120 recognizes the device acoustic source as audio stream (media, e.g., music) (S123), and changes from the initial state to the third output mode (S130).

In the third output mode, the control device 120 stops reproducing the source acoustic source, and changes the acoustic source path of the car audio output itself to the peripheral device 200 so that the device acoustic source is outputted through the car audio output unit 111 (S140).

The configuration of the car audio output control device and the method therefor according to the present disclosure is not limited to the above-described embodiment and may be variously modified within the permitted range by the technical spirit of the present disclosure.

| | |
|---|---|
| 100: Car audio system | 110: Car audio |
| 111: Car audio output unit | 120: Car audio output control device |
| 121: Interface unit | 122: Control unit |
| 123: Storage unit | 200: Peripheral device |

The present disclosure relates to a car audio output control device and a method therefor, in particular, for optimally controlling the car audio output change according to an acoustic source attribute, and allowing a user to clearly recognize important information (notification, emergency/disaster information) provided as an acoustic source.

The invention claimed is:

1. A car audio output control device, comprising:
a storage unit that stores an identification code for each output mode with respect to a plurality of output modes;
an interface unit that receives a device acoustic source and an identification code defining an importance of the device acoustic source from a peripheral device when an acoustic source generated from the peripheral device is detected; and
a control unit that controls an output of a car audio such that when a device acoustic source and an identification code are received through the interface unit while a source acoustic source self-generated from the car audio is outputted, the control unit identifies the identification code for each output mode stored in a storage unit and selects one output mode matched with the received identification code from among the plurality of output modes, and controls an acoustic source path of the source acoustic source from the car audio to a car audio output unit and an acoustic source path of the device acoustic source from the peripheral device to the car audio output unit according to the selected output mode so as to output an acoustic source corresponding to a changed acoustic source path,
wherein an acoustic source path and acoustic source state of the output of the car audio are controlled so as to be different with respect to each of the plurality of output modes,
wherein when the received identification code is a first identification code, the control unit mutes a source acoustic source being reproduced and outputs a device acoustic source as a car audio output,
when the received identification code is a second identification code, the control unit reduces the volume of a source acoustic source being reproduced and mixes the source acoustic source with a device acoustic source, and outputs a mixed acoustic source as the car audio output, and
when the received identification code is a third identification code, the control unit stops a reproducing source acoustic source and changes an acoustic source path to output a device acoustic source of the peripheral device,
wherein the control unit receives the first identification code when a type of the device acoustic source is alert, the control unit receives the second identification code when a type of the device acoustic source is prompt, the control unit receives the control unit receives the third identification code when a type of the device acoustic source is audio stream.

2. The car audio output control device according to claim 1, wherein an identification code is a value of setting the importance of a device acoustic source, and the plurality of output modes is a value of adjusting the level of focus on listening to a device acoustic source, and
the control unit selects an output mode according to a value of an identification code received together with a device acoustic source, and controls a output of the car audio based on the selected output mode so that the level of focus on listening is adjusted to suit the importance of a device acoustic source.

3. The car audio output control device according to claim 2, wherein the plurality of output modes is defined such that the level of focus on listening to a device acoustic source increases with the increasing importance of the device acoustic source according to an identification code.

4. The car audio output control device according to claim 1, wherein in each of the plurality of output modes,
at least one function of whether to change an acoustic source path of the output of the car audio, whether to stop a source acoustic source, whether to mute a source acoustic source, whether to mix a device acoustic source with a source acoustic source, and a mixing profile is controlled so as to be different.

5. A car audio output control method, comprising:
outputting a source acoustic source self-generated by a car audio;
receiving a device acoustic source and an identification code defining an importance of the device acoustic source from a peripheral device when an acoustic source generated from the peripheral device is detected; and
identifying the identification code for each output mode stored in a storage unit and selecting one output mode matched with the received identification code from among a plurality of preset output modes and controlling an acoustic source path of the source acoustic source from the car audio to a car audio output unit and an acoustic source path of the device acoustic source from the peripheral device to the car audio output unit according to the selected output mode so as to output an acoustic source corresponding to a changed acoustic source path,
wherein an acoustic source path and acoustic source state of the output of the car audio are controlled so as to be different with respect to each of the plurality of output mode, the car audio output control method further comprising:

muting a source acoustic source being reproduced and outputting a device acoustic source as a car audio output when the received identification code is a first identification code, reducing the volume of a source acoustic source being reproduced and mixing the source acoustic source with a device acoustic source and outputting a mixed acoustic source as the car audio output when the received identification code is a second identification code, stopping a source acoustic source being reproducing and changing an acoustic source path to output a device acoustic source of the peripheral device when the received identification code is a third identification code, wherein the first identification code is received when a type of the device acoustic source is alert, the second identification code is received when a type of the device acoustic source is prompt, and the third identification is received when a type of the device acoustic source is audio stream.

* * * * *